United States Patent
Kuwahara et al.

(10) Patent No.: US 6,926,050 B2
(45) Date of Patent: Aug. 9, 2005

(54) CUTTING TOOL HOLDER AND METHOD FOR USING THE SAME

(75) Inventors: Minoru Kuwahara, Seki (JP); Hiroshi Fujii, Aichi-ken (JP); Takao Kato, Gifu (JP); Takashi Oumura, Kakamigahara (JP)

(73) Assignee: Gifu University, Gifu (JP)

( * ) Notice: Subject to any disclaimer, the term of this patent is extended or adjusted under 35 U.S.C. 154(b) by 213 days.

(21) Appl. No.: 10/334,016

(22) Filed: Dec. 30, 2002

(65) Prior Publication Data

US 2004/0007106 A1 Jan. 15, 2004

(30) Foreign Application Priority Data

Jul. 10, 2002 (JP) ........................................ 2002-200870

(51) Int. Cl.[7] ................................................ B27C 1/00
(52) U.S. Cl. ...................................................... 144/115
(58) Field of Search .............................. 83/74, 564, 58, 83/588, 589; 144/115; 414/744.1–744

(56) References Cited

U.S. PATENT DOCUMENTS 4,414,873 A * 11/1983 Besemann et al. ............. 83/311
5,931,071 A * 8/1999 Mori ............................. 83/74

FOREIGN PATENT DOCUMENTS

| DE | 35 23 865 | 1/1987 |
| DE | 42 39 344 | 6/1993 |
| JP | 63-191512 A | 8/1988 |
| JP | 06-063817 A | 3/1994 |
| JP | 06-114660 A | 4/1994 |
| JP | 11042501 | 2/1999 |
| JP | 11-170113 A | 6/1999 |

* cited by examiner

Primary Examiner—Derris H. Banks
Assistant Examiner—Shelley Self
(74) Attorney, Agent, or Firm—Marsh Fischmann & Breyfogle LLP

(57) ABSTRACT

A cutting tool holder for holding a cutting member, which is attached to a drive unit for driving the cutting member. A first elastic member is elastically deformable in a first direction. A second elastic member is elastically deformable in a second direction different from the first direction. An elastic connection member elastically connects the first and second elastic members. A first attachment member is disposed in the first elastic member to be connected to the drive unit. A second attachment member is disposed in the second elastic member to attach the cutting member.

8 Claims, 6 Drawing Sheets

CUTTING TOOL HOLDER AND METHOD FOR USING THE SAME

BACKGROUND OF THE INVENTION

The present invention relates to a cutting tool holder having a flexible structure, which is loaded on a device such as an industrial robot to enable cutting, and a method for using the same.

Heretofore, studies have been conducted on manufacturing of devices that have "flexibility" provided to the human "hand", "arm" and "body". Because of the difficulty of providing the entire device with flexibility, there has been developed a device having "the flexibility" in a state where a part or accessories of the device have high rigidity. Examples of such a device include a device for manufacturing, cutting and carrying soft articles such as sponges, a device for carrying bean curds, and a device for manufacturing bean-jam buns.

On the other hand, as machines and devices in which "the rigidity" is emphasized, there are a variety of machine tools, automobiles, and robots. Many studies have been conducted on achievement of the high rigidity for machine tools. Especially, with regard to a holder for holding a cutting tool, many researches have been made on its structure and material, and in consequence, sharper and more wear-resistant cutting knives have been developed.

By the utilization of the highly rigid blade obtained in the above-described manner, the cutting is carried out, but at conventional machining, the cutting knife is rotated, or a work piece is rotated. In this case, a proper relative speed between the work piece and the blade is secured to increase machining efficiency.

On the other hand, motion of cutting knives is often linear in fields such as chiseling by a carpenter, chiseling in craftworks manufacturing, and scraping in mechanical engineering. Mechanization of such a processing method is often difficult, which delays development of proper mechanical systems and tool holders.

Heretofore, in order to make linear motion (linear swing motion) of a very short distance, development has been advanced on a device for carrying out the cutting in a designated position by attaching the cutting knife to a robot, which acts as a drive unit for driving the cutting knife. However, devices and systems for carrying out the cutting while moving the cutting knife linearly in large movements have not been present yet.

In developing various processing equipments and systems, it is necessary to understand what parameters are the main factors in work by reproducing the work of a skilled hand, based on a variety of information obtained from a working state of the skilled hand. In the methods available thus far, main factors have been considered to be a force applied by the skilled hand, and a cutting speed. The cutting has been carried out by supplying information derived from the two factors to a cutting tool loaded on a highly rigid device.

In such a method, however, it has been difficult to obtain a state similar to a processing result obtained by the skilled hand. There is no doubt that the above two factors are main factors. However, it will be presumed that factors regarding know-how of the skilled hand remarkably affect the processing result. In this connection, however, how to obtain elements constituting the know-how as knowledge has been a serious problem.

Conventionally, a tool having rigidity has been used for the cutting. According to this method, in order to carry out the predetermined cutting, materials have been used having a higher rigidity and volume than necessary. Therefore, if the highly rigid device is directly used for the system for linearly moving the cutting tool, inefficiency occurs in the process of applying a force, and the cutting tool is frequently damaged or broken down to cause great economic loss.

In addition, in the system having the cutting tool attached to the highly rigid machine, work patterns are limited. By combining several limited work patterns, a system called a machining center is constituted. On the other hand, although cutting work carried out by the skilled hand has a problem of efficiency, higher shape accuracy and flatness accuracy can be obtained than by machining. Particularly, in the processing method where the cutting tool is linearly moved, as in the case of chiseling, subtle touching by the skilled hand, and coordinated movements of parts of the body are of great importance in work accuracy. This processing method emphasizes "the flexibility" having both "the rigidity" and "the flexibility" specific to the body of the skilled hand.

The inventors of the present case particularly took up the scraping work by the skilled hand to analyze a cutting force applied to the cutting tool during the cutting, and motion and displacement of a tool 50 at the time. The result is shown in FIG. 8. In FIG. 8, a surface of a material to be cut (a work material) 52 is set as an X-Y plane, a cutting force is applied in the cutting direction (X direction) as Fx, a cutting force is applied in the direction perpendicular to the X direction as Fy, and a cutting force is applied in the downward direction perpendicular to the X-Y plane as $-Fz$. In addition, reference codes dx, dy and dz respectively denote displacement amounts of the tool 50 in the X, Y and Z directions. In FIG. 8, Fy and dy are not shown.

The skilled hand carries out the scraping work within an extremely short time. By this operation, the skilled hand applies a load on a scraper 51 disposed on the distal end side of the tool 50 by the left hand, and bends the scraper 51 while moving the center of gravity to the right foot, and pulling back the tool to lower a position of the center of gravity of the body. At this time, the distal end (cutting edge) of the tool slightly bites in the surface of the work material 52. The skilled hand carries out the cutting by pushing the entire tool forward while quickly moving the center of gravity from the right foot to the left foot by using a spring-back effect of the tool 50.

Thus, it can be understood that in the scraping work, not only a force is transmitted to the scraper 51 by three-dimensional movement of the body center of gravity of the skilled hand or motion of the arm, but also "flexible" motion of the skilled hand is necessary for providing proper motion to the scraper 51.

However, the conventional industrial robot has been highly rigid and, when a cutting member such as the scraper 51 was directly disposed in the tool holder, it was not easy to carry out processing by reproducing human "flexibility."

SUMMARY OF THE INVENTION

It is an object of the present invention to provide a cutting tool holder, which can be loaded on a device such as an industrial robot, and which enables processing to be carried out by reproducing human "flexibility" when a cutting member is directly disposed in the tool holder, and a method for using the cutting tool holder.

To achieve the foregoing and other objectives and in accordance with the purpose of the present invention, a cutting tool holder for holding a cutting member, which is attached to a drive unit for driving the cutting member, is provided. The cutting too holder includes a first elastic member, a second elastic member, an elastic connection member, a first attachment member, and a second attachment member. The first elastic member is elastically deformable in a first direction. The second elastic member is elastically deformable in a second direction different from the first direction. The elastic connection member elastically connects the first and second elastic members. The first attachment member is disposed in the first elastic member and connected to the drive unit. The second attachment member is disposed in the second elastic member to attach the cutting member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a first embodiment of the present invention will be described with reference to FIGS. 1 to 5.

Figure 1:
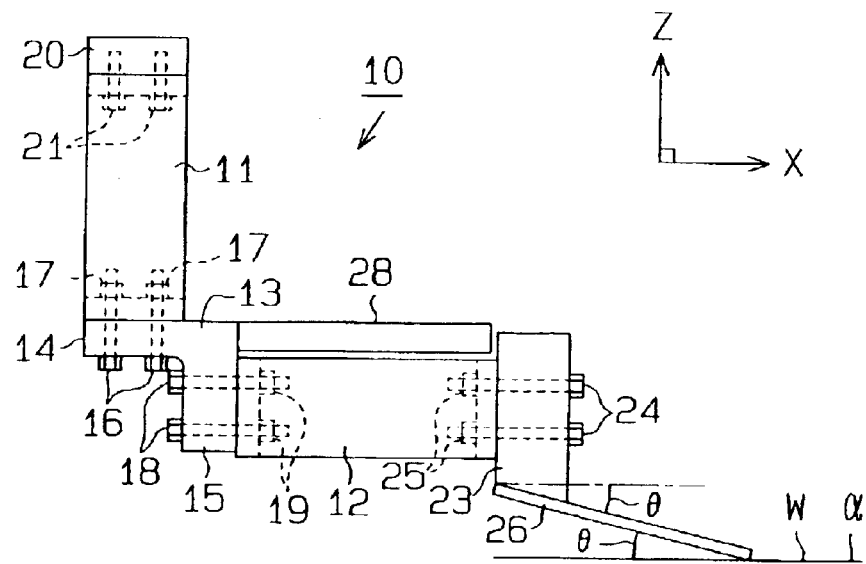
FIG. 1 is a side view of a cutting tool holder according to a first embodiment of the present invention.
Figure 2:
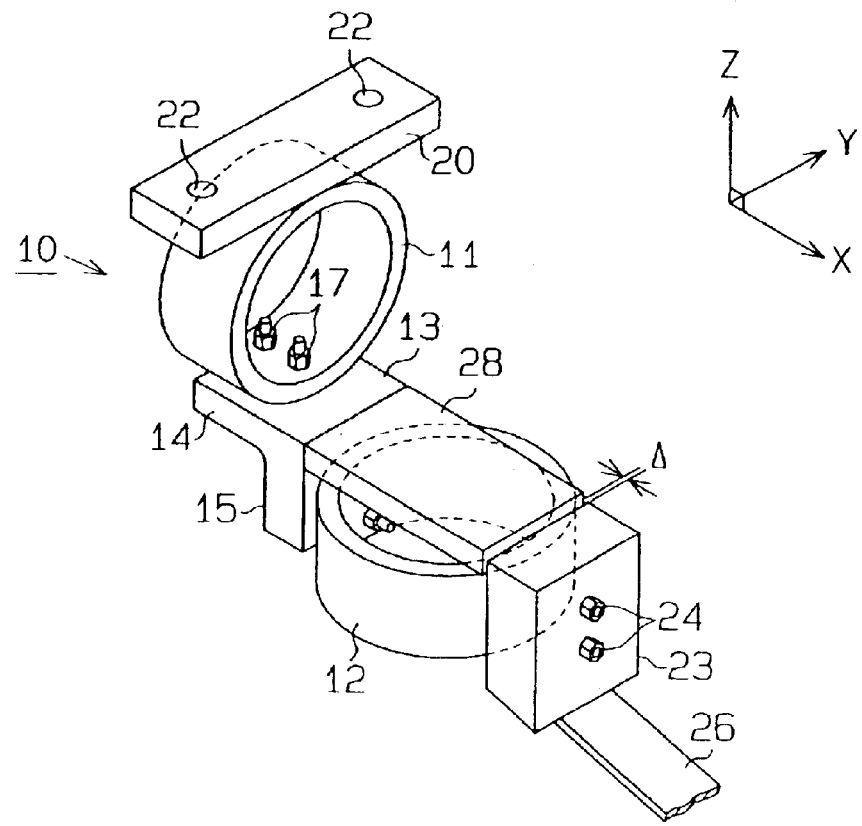
FIG. 2 is a perspective view showing the cutting tool holder of the first embodiment.

As shown in FIGS. 1 and 2, a cutting tool holder 10 is provided with a first ring 11 and a second ring 12 made of metal, and a connection fitting 13. The first ring 11 and the second ring 12 are formed in circular shapes to have elasticity. The depths, outer diameters, and materials of both rings 11 and 12 are decided depending on a material of a work material, and an amount of cutting (depth, length, width or the like). The first ring 11 and the second ring 12 are fixed to each other by the connection fitting 13. The connection fitting 13 is L-shaped in section by first and second attachment plates 14 and 15 having elasticity, and both attachment plates 14 and 15 are extended to be orthogonal to each other. The thickness of the inner side of a connection portion between the first and second attachment plates 14 and 15 is increased along a circular arc to be reinforced as shown in FIGS. 1 and 2.

The first ring 11 corresponds to a first elastic member, and the second ring 12 corresponds to a second elastic member. The connection fitting 13 corresponds to an elastic connection member. The first attachment plate 14 corresponds to a first attachment section, and the second attachment plate 15 corresponds to a second attachment section.

The first ring 11 is fastened by bolts 16 and nuts 17 to an outer periphery of the first attachment plate 14. Adhesive or welding may be used in place of the bolts and the nuts. The second ring 12 is fastened by bolts 18 and nuts 19 to an outer periphery of the second attachment plate 15. Accordingly, by being fixed to the first and second attachment plates 14 and 15, the first ring 11 and the second ring 12 are arranged to have elastic forces in directions orthogonal to each other.

That is, the first ring 11 has elastic forces at least in the Z direction, and the direction opposite to the Z direction. In other words, the first ring 11 is elastically deformable in the Z direction. The second ring 12 has elastic forces at least in the X direction, and the direction opposite to the X direction. In other words, the second ring 12 is elastically deformable in the X direction.

Figure 3:
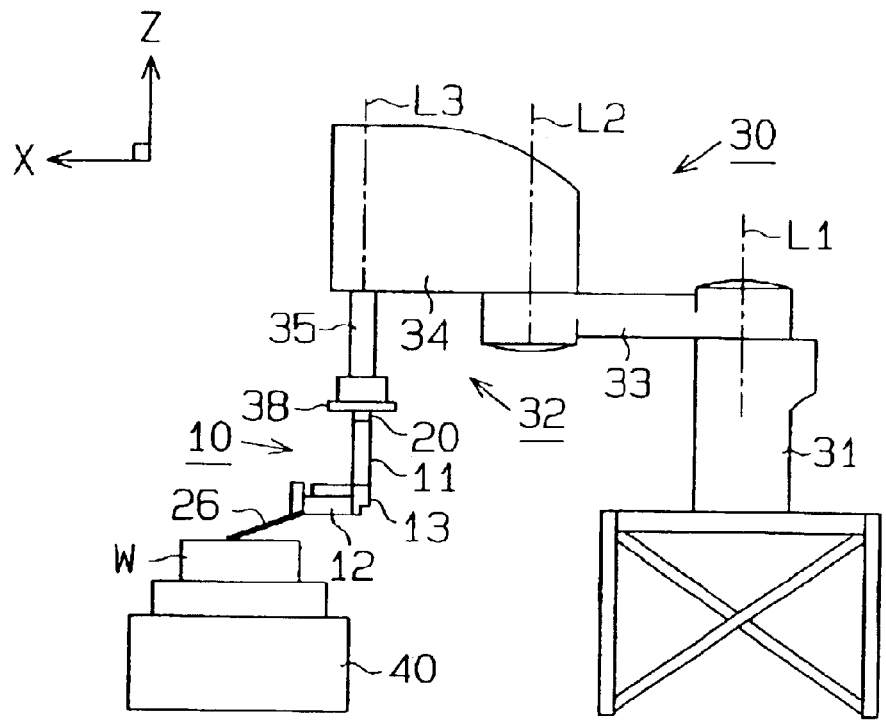
FIG. 3 is a side view showing the cutting tool holder of FIG. 1 attached to a robot.

An attachment plate (first attachment member) 20 is fastened by bolts 21 to the first ring 11 so as to face the first attachment plate 14. The attachment plate 20 is formed to be a square plate in shape, and bolt insertion holes 22 are formed in both ends thereof. As shown in FIG. 3, the cutting tool holder 10 is attached to a final output shaft 35 of a robot arm 32 provided for a robot 30 by detachably screwing in and fixing bolts (not shown) through the bolt insertion holes 22.

The final output shaft 35 corresponds to an external device, and the attachment plate 20 corresponds to an attachment section of the external device.

On the second ring 12, a scraper attaching plate (second attachment member) 23 is fastened by bolts 24 and nuts 25 so as to be positioned on the opposite side of the second attachment plate 15. An adhesive or welding may be used in place of the bolts and the nuts. A scraper 26 is attached as a cutting member to the bottom of the scraper attaching plate 23. The attachment of the scraper 26 to the scraper attaching plate 23 is carried out by welding, adhesive, bolts or the like to fasten it. As shown in FIG. 1, a cutting part (cutting edge) of the distal end of the scraper 26 is extended from the scraper attaching plate 23 obliquely downward in the direction opposite to the second ring 12. The scraper 26 is arranged to have a predetermined angle θ with respect to a work material W, which has a horizontally arranged processed surface. According to the present embodiment, when the horizontally arranged processed surface (surface) is set as an X-Y plane, and the first ring 11 is arranged in the Z direction orthogonal to the X-Y plane as shown in FIG. 1, an angle (predetermined angle θ) between the scraper 26 and the processed surface is set to 18°±10°.

The scraper attaching plate 23 corresponds to an attachment section of a cutting part, and the scraper 26 corresponds to a cutting member. In the present embodiment, a material of the work material W is metal, for example steel, cast iron, brass or plaster.

A cutting stabilization tool 28 is fixed at one end to an upper portion of the second attachment plate 15 to be supported in cantilever, and the other end is arranged apart from, and facing an upper portion of the scraper attaching plate 23.

The cutting stabilization tool 28 is arranged to be positioned between the connection fitting 13 and the scraper attaching plate 23, and in parallel with the second ring 12. A distance Δ between the cutting stabilization tool 28 and the scraper attaching plate 23 is set to a distance, which enables abutment when the second ring 12 is deformed in a direction of approaching both ends thereof to each other against its own elasticity in the X direction shown in FIGS. 1 and 2. The distance Δ is set in such a way as to obtain time for generating sufficient starting torque when a large reactive force is applied on the final output shaft 35 of the robot arm 32 of the robot 30, to which the cutting tool holder 10 is attached. That is, the distance Δ is set such that, when the scraper 26 advances to a position approximately identical to a point "B" in a moving locus "A"→"B"→"C"→"D" of the scraper 26 (see FIG. 4), or a position very slightly apart in the X direction, the second ring 12 is deformed to abut the cutting stabilization tool 28 on the scraper attaching plate 23. In other words, when a deformation degree of the second ring 12 becomes large, the cutting stabilization tool 28 is abutted on the scraper attaching plate 23.

In place of the above-mentioned embodiment, the cutting stabilization tool 28 may be fixed at one end to the upper portion of the scraper attaching plate 23 to be supported in cantilever, and the other end may be arranged away from, and facing the upper part of the second attachment plate 15. In this case, the distance Δ is set in such a way as to abut the cutting stabilization tool 28 on the second attachment plate 15 during deformation of the second ring 12.

In addition, in this case, as a deformation degree of the second ring 12 in the X direction and the direction opposite to the X direction becomes larger, the cutting stabilization tool 28 operatively interconnects the first ring 11 and the scraper attaching plate 23 through the cutting stabilization tool 28.

The cutting stabilization tool 28 corresponds to a first highly rigid member, and is set to be higher in the rigidity than the first ring 11 and the second ring 12.

The cutting stabilization tool 28 has an intrinsic frequency that does not resonate with a vibration frequency of each of the first ring 11 and the second ring 12. That is, the intrinsic frequency of the cutting stabilization tool 28 is set in a frequency region lower than a frequency of chatter, which is generated because of a shortage of the rigidity of the second ring 12 and the connection fitting 13 during the cutting along a moving locus of points "B"→"C"→"D" of the scraper 26. The intrinsic frequency of the cutting stabilization tool 28 may be set in a frequency region higher than the frequency of chatter vibration.

Next, description will be given of the robot 30, to which the cutting tool holder 10 is attached.

The robot 30 is provided with a base 31, and the robot arm 32. The robot arm 32 is constituted of first and second arms 33 and 34. The first arm 33 is supported in such a way as to actively rotate its base end around an axis L1 parallel to the Z direction with respect to the base 31 by a motor (not shown) as shown in FIG. 3. The second arm 34 is supported at the distal end of the first arm 33 in such a way as to be actively rotated around an axis L2 parallel to the Z direction by a motor (not shown) as shown in FIG. 3. At the distal end of the second arm 34, the final output shaft 35 is disposed in such a way as to be actively rotated around an axis L3 parallel to the Z axis by a motor (not shown). The final output shaft 35 can also be reciprocated in the Z direction (in the vertical direction in the present embodiment) with respect to the second arm 34 by the motor (not shown). A support plate 38 relative to the attachment plate 20 is disposed at the bottom of the final output shaft 35. In the support plate 38, bolt holes (not shown) are disposed to detachably screw in and fix bolts inserted into the respective bolt insertion holes 22 of the attachment plate 20.

Each of the above-described motors (not shown) is controlled by a control program stored in a memory in a control unit (not shown). That is, each of the first arm 33 and the second arm 34, and the final output shaft 35 is operated by the control program, and the cutting tool holder 10 attached to the support plate 38 is reciprocated in the X, Y and Z directions.

Now, description will be given of an operation of scraping carried out by attaching the cutting tool holder 10 constituted in the foregoing manner to the robot 30.

First, the attachment plate 20 of the cutting tool holder 10 is fastened to the support plate 38 of the robot 30 by bolts (not shown) inserted into the bolt insertion holes 22. In this state, the first ring 11 is arranged in the Z direction, and the second ring 12 is arranged in the X direction. The work material W is loaded below the cutting edge of the scraper 26 through a very small space. Rough adjustment of the space between the scraper 26 and the work material W is made beforehand by an attachment base 40, on which the work material W is loaded. Fine adjustment of the space is made by adjusting the final output shaft 35 of the robot 30 in the Z direction based on a control signal from an input unit of the control unit (not shown). In place of setting the very small space, the cutting edge of the scraper 26 may be set in a state of being in contact with the work material W. Both states are called cutting standby states.

Then, in the cutting standby state where the very small space is set between the scraper 26 and the work material W, or in the cutting standby state where the scraper is in contact with the work material W, a control program for scraping is executed.

Figure 4:
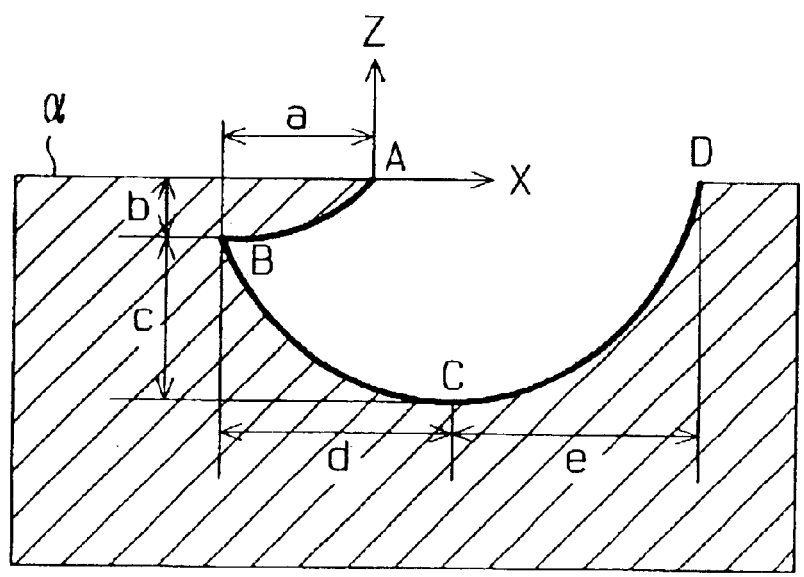
FIG. 4 is an explanatory view of a moving locus of a scraper in the holder of FIG. 1.

As shown in FIG. 4, the control program for scraping is provided to drive the motors for the robot arm 32 (first arm 33 and second arm 34) and the final output shaft 35 in order to move the scraper 26 in order of the points "A"→"B"→"C"→"D".

The point "A" in FIG. 4 indicates an initial contact point of the scraper 26 with respect to the work material W, the point "B" a pull-back point, the point "C" a lowest point of the scraper 26, and the point "D" a final contact point of the scraper 26 to the work material W. In FIG. 4, a distance "a" is a moving distance in an initial horizontal direction (opposite X direction), a distance "b" is a moving distance in an initial vertical direction (opposite Z direction), and a distance "b+c" is a cut setting value. A distance "d" is a horizontal distance between the pull-back point "B" and the lowest point "C", and a distance "e" is a horizontal distance between the lowest point "C" and the final contact point "D". 0<distance "a"<distance "d+e" is set, and the horizontal distance between the pull-back point "B" and the final contact point "D" is set longer than the initial horizontal-direction distance "a". The distance "a" may be set to 0.

The control program is provided to obtain a moving locus similar to scraping work carried out by a skilled hand. That is, in the memory of the control unit (not shown) of the robot 30, in order to obtain the moving locus of the points "A"→"B"→"C"→"D", various data regarding a position for executing scraping (processing position), an amount of movement (amount of processing), and the like are stored together with the control program. The moving locus of the scraper 26 shown in FIG. 4 is obtained as a result of analyzing the scraping work carried out by the skilled hand.

The skilled hand brings the cutting knife into contact with the work material W at the point "A", then moves the cutting tool to the point "B" while causing the tool to bite in, and bends the scraper 26 while carrying out a so-called push-back work. By using a spring-back effect of the bending at this time, the cutting knife is advanced at a dash to bite in more, and pass through the points "B", "C", and "D", and thereby cutting work is carried out. After the passage through the point "C", the direction is changed to direct the cutting edge to the surface of the work material.

Here, the spring-back effect means a return to a state before a plate part is bent by an elastic force, when a load is removed after the plate part of the scraper 26 is bent. In the present embodiment, the spring-back effect is used in the expectation that plate returning speed will become faster than speed during deformation.

In FIG. 4, a reference code a denotes a position of a processed surface of the work material W. Hatching is drawn for convenience to clarify the moving locus of the scraper 26, but not to indicate a section of the work material W.

In contrast, in the present embodiment, the points "A"→"B"→"C"→"D" are the same as the locus of the final output shaft 35 of the robot arm 32.

When the control unit executes the control program, the final output shaft 35 of the second arm 34 is moved downward, and the movement of the final output shaft 35 is transmitted to the first ring 11 to bring the scraper 26 into contact with the point "A" of the work material W. By this contact, the first ring 11 is deformed against its own elasticity. Then, the final output shaft 35 causes the scraper 26 to bite slightly in the work material W, and move to the point "B" positioned in the direction opposite to the X direction (cutting direction). At this time, since the cutting edge of the scraper 26 bites in the work material W, the connection fitting 13 is deformed against its own elasticity. That is, by the deformation of the connection fitting 13, a spring force is stored in the connection fitting 13. The stored spring force is released when the final output shaft 35 is moved in the X direction, and can be used as a cutting force in the Z direction.

Subsequently, the final output shaft 35 advances in the X direction. In an initial stage of the movement in the X direction, however, the second ring 12, and the second attachment plate 15 of the connection fitting 13 is deformed respectively against own elasticity while storing elastic energies.

Incidentally, in order to enable the final output shaft 35 of the robot 30 to make linear motion in the initial stage of the movement in the X direction, motive powers of all the units of the robot must be started all at once. Generally, motor starting torque rises within a short time to be ignored normally. However, since the cutting edge of the scraper 26 bites in the work material W, and initial starting torque of each motor is small, the operation cannot be started in this state.

According to the present embodiment, however, by the deformations of the second ring 12 and the connection fitting 13, the elastic energies are stored, and time is gained until motor starting torque rises.

Consequently, driving torque becomes large during the gained time, and the cutting can be carried out even by small starting torque of the robot 30.

If the cutting stabilization tool 28 is not disposed, then when chatter is generated because of a shortage of the rigidity of the second ring 12 and the connection fitting 13 while the scraper 26 carries out the cutting along the moving locus of the points "B"→"C"→"D", the chatter is also propagated to the processed surface of the work material W. When the chatter is propagated, irregularities occur on the cut surface of the work material W to reduce its commercial value.

However, according to the present embodiment, the cutting stabilization tool 28 is operated from a position immediately after the scraper 26 passes through the point "B". That is, when the scraper 26 reaches a position a little before the point "C", the second ring 12 is deformed to abut the cutting stabilization tool 28 on the scraper attaching plate 23. Therefore, the cutting tool holder 10 exhibits a nonlinear effect shown in FIG. 5 to suppress chatter.

The intrinsic frequency of the cutting stabilization tool 28 is set so as not to resonate with the vibration frequency of each of the first ring 11 and the second ring 12. Thus, the processed surface of the work material W is not adversely affected by chatter, whereby a good processed surface can be obtained.

Figure 5:
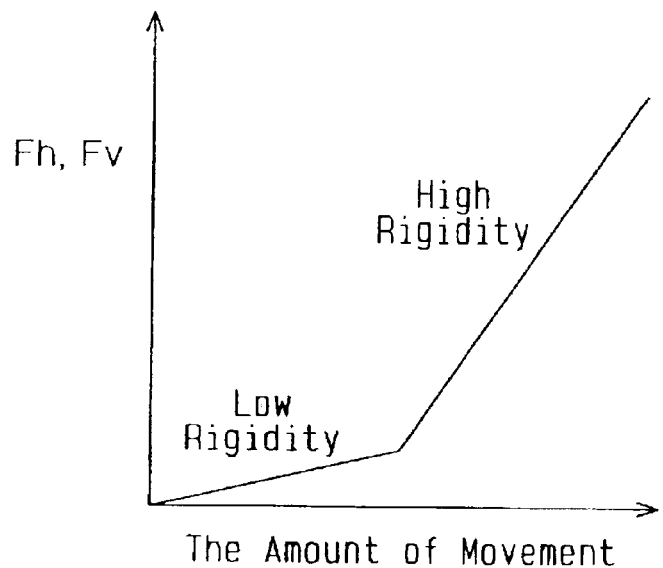
FIG. 5 is a characteristic view showing a nonlinear effect of the cutting tool holder of FIG. 1.

FIG. 5 is a characteristic view showing the nonlinear effect of the cutting tool holder 10. An ordinate shows a force Fv applied in the direction opposite to the Z direction, and a force Fh applied in the X direction. An abscissa shows an amount of movement of the scraper 26 in the direction opposite to the Z direction, and an amount of movement in the X direction. As shown in the drawing, the cutting tool holder 10 exhibits the low rigidity while an amount of movement is small, and the high rigidity after a predetermined amount of movement is reached.

Thus, the scraper 26 is moved from the point "D" to the outside of the work material W to finish a series of processing operations.

Then, in order to move the scraper 26 to another position (processing position) for executing scraping, the control unit moves the final output shaft 35 to continuously carry out similar processing work in accordance with the control program.

In the present embodiment, the Z direction corresponds to a first direction, and the X direction corresponds to a second direction and a cutting direction.

The present embodiment provides the following operation effects.

(1) In the cutting tool holder 10 of the present embodiment, the first ring 11 (first elastic member) having elastic forces in the Z direction and the direction opposite to the Z direction (first direction and the direction opposite to the first direction), and the second ring 12 (second elastic member) having elastic forces in the X direction orthogonal to the Z direction and the direction opposite to the X direction (second direction and the direction opposite to the second direction) are connected to each other. In the present embodiment, these members are connected through the connection fitting 13.

The first ring 11 is provided with the attachment plate 20 (attachment section of the external device) for attaching to the final output shaft 35 (external device). The second ring 12 is provided with the scraper attaching plate 23 (attachment section of the cutting part), to which the scraper 26 (cutting member) extended in the X direction is attached.

Consequently, the cutting tool holder 10 can be attached to the robot 30, and scraping can be carried out by imitating the operation of the skilled hand during scraping work.

(2) In the cutting tool holder 10 of the present embodiment, the attachment plate 20 is disposed in the first ring 11 (first elastic member), and the scraper attaching plate 23 is disposed in the second ring 12 (second elastic member).

In addition, the cutting stabilization tool 28 (first highly rigid member) having rigidity higher than that of the first ring 11 and the second ring 12 is disposed in parallel with the second ring 12. Further, the cutting stabilization tool 28 is arranged so that as the degree of deformation of the second ring 12 becomes larger in the second direction and the direction opposite to the second direction, the first ring 11 and the scraper attaching plate 23 can be operatively interconnected through the cutting stabilization tool 28.

According to the constitution, the cutting tool holder 10 exhibits the low rigidity by the second ring 12 when a deformation degree of the second ring 12 in the X direction and the direction opposite to the X direction (second direction, and the direction opposite to the second direction) is small. When a deformation degree of the second ring 12 in the X direction and the direction opposite to the X direction is large, the cutting tool holder 10 exhibits the high rigidity by the cutting stabilization tool 28.

If the cutting edge of the scraper 26 bites in the work material W and initial driving torque of each motor is small, each motor cannot be started. Even if this is the case, elastic energies can be stored while the degree of deformation of the second ring 12 is small, and time can be gained until motor starting torque rises.

As the result, the cutting can be carried out even by small starting torque of the robot 30.

Moreover, according to the present embodiment, when the cutting stabilization tool 28 reaches a position a little after the point "B", if the degree of deformation of the second ring 12 becomes large, the cutting stabilization tool 28 is abutted on the scraper attaching plate 23 to operatively interconnect both. Thus, the cutting tool holder 10 exhibits the nonlinear effect to suppress chatter vibration.

(3) In the cutting tool holder 10 of the present embodiment, the first ring 11 is formed as the first elastic member. Thus, compared with a case of constituting a first elastic member of a coil spring or the like, attachment to the attachment plate 20 and the connection fitting 13 can be easily carried out by the bolts 16, 21, and the nuts 17. In addition, the structure of the cutting tool holder 10 can be made simple.

The attachment of the first ring 11 to the attachment plate 20 and the connection fitting 13 may be carried out by adhesive, welding or the like in accordance with a work material or an amount of the cutting.

(4) In the cutting tool holder 10 of the present embodiment, the second ring 12 is formed as the second elastic member.

Consequently, compared with a case of constituting a second elastic member of a coil spring or the like, attachment to the scraper attaching plate 23 and the connection fitting 13 can be carried out easily by the bolts 18, 24, and the nuts 25. In addition, the structure of the cutting tool holder 10 can be made simple.

(5) In the cutting tool holder 10 of the present embodiment, the first ring 11 and the second ring 12 are interconnected through the connection fitting 13 (elastic connection tools). That is, the connection fitting 13 is L-shaped in section by the first attachment plate 14 (first attachment section), and the second attachment plate 15 (second attachment section), and the first ring 11 and the second ring 12 are respectively fixed to the first attachment plate 14 and the second attachment plate 15.

Accordingly, when the final output shaft 35 moves the scraper 26 to the point "B" while causing the scraper 26 to slightly bite in the work material W, since the cutting edge of the scraper 26 bites in the work material W, the connection fitting 13 is deformed against its own elasticity to store a spring force therein. Thus, thereafter, when the scraper 26 is moved in the X direction, the stored spring force can be used for the cutting in the X direction.

(6) In the cutting tool holder 10 of the present embodiment, the cutting stabilization tool 28 (first highly rigid member) has an intrinsic frequency which does not resonate with a vibration frequency of each of the first ring 11 (first elastic member) and the second ring 12 (second elastic member).

Consequently, the processed surface of the work material W is not adversely affected by chatter vibration, whereby a good processed surface can be obtained.

(7) In the method for using the cutting tool holder 10 according to the present embodiment, the final output shaft 35 (external device) of the robot 30 moves the scraper 26 (cutting member) attached to the cutting tool holder 10 in the direction opposite to the Z direction, or in an opposite first direction, so that the scraper 26 contacts the work material W.

Then, the scraper 26 is caused to bite in the work material W, and pushed back in the direction (opposite to the second direction) opposite to the cutting direction (X direction). Subsequently, in accordance with a value ("d+e") longer than the pushed back length (initial horizontal direction moving distance "a"), the scraper 26 is pushed in the cutting direction (X direction) to bite in the work material W, whereby the work material W is cut.

Thus, by using the robot 30 on which the cutting tool holder 10 is loaded, scraping can be carried out in the manner similar to that of the skilled hand.

(8) Since the cutting tool holder 10 can be loaded on the robot 30 to be moved in arbitrary directions of X, Y and Z, automatic scraping can be carried out, and an efficiency of scraping can be achieved that is higher than that of the conventional scraping by the skilled hand. Accordingly, scraping can be carried out without relying on the skilled hand, and anybody can easily carry out scraping by using the robot 30.

(9) According to the present embodiment, the robot is a multispindle robot. Thus, scraping can be carried out without moving the work material W, and without changing a direction of the work material W.

(10) By using the robot 30, control of a cutting amount, and control of a state of a processed surface, can be easily carried out, which has been difficult even by the skilled hand.

(11) Furthermore, according to the present embodiment, by changing size and thickness of the first ring 11, the second ring 12, and the cutting stabilization tool 28, a processing state similar to that of the skilled hand, or conversely a processing state specific to the machine using the robot 30 can be achieved.

Next, description will be given of a cutting tool holder 100 according to a second embodiment by referring to FIG. 7.

The cutting tool holder 100 is provided with a ring 101, and a cutting stabilization tool 102 as a highly rigid member. The ring 101 is provided with a ring main body 101a formed in an elliptical shape by a metal plate. A long axis of the ring main body 101a is extended in the X direction. The ring main body 101a has elasticity at least in the Z direction, the direction opposite to the Z direction, the X direction orthogonal to the Z direction, and the direction opposite to the X direction. The cutting stabilization tool 102 is arranged in the ring 101. The cutting stabilization tool 102 is formed to be a square pole in shape, and is fixed at the right end or left end to the ring main body 101a of the ring 101 by an adhesive to be supported in cantilever. The cutting stabilization tool 102 may be fixed to the ring 101 by bolts or the like.

According to the present embodiment, a free end of the side of the cutting stabilization tool 102, which is not supported in cantilever, is arranged apart from the ring main body 101a by a distance Δ approximately equal to a fitting error. As the fitting error is about several μm, the distance Δ is not shown in the drawing. As in the case of the first embodiment, the distance Δ is set in such a way as to obtain time enough to generate starting torque when a large reactive force is applied on a final output shaft 35 of a robot arm 32 of a robot 30, to which the cutting tool holder 100 is attached.

The rigidity of the cutting stabilization tool 102 is set higher than that of the ring main body 101a.

The ring 101 is divided into an upper elastic section 103 positioned above the cutting stabilization tool 102, and a lower elastic section 104 positioned below the cutting stabilization tool 102. The cutting tool holder 100 is provided with elastic forces in the Z and X directions by the upper elastic section 103 and the lower elastic section 104. By providing the cutting stabilization tool 102, the cutting tool holder 100 provided with the cutting stabilization tool 102 and the lower elastic section 104 has a nonlinear spring constant.

Setting of the nonlinear spring constant is decided depending on the thickness, width and material of the ring 101, and the material and cutting amount of a work material.

An intrinsic frequency of the cutting stabilization tool 102 is set so as not to resonate with a vibration frequency of the lower elastic section 104.

On the upper surface of the upper elastic section 103, an attachment plate 105 is fixed by an adhesive. The attachment plate 105 may be fixed to the upper elastic section 103 by bolts. In both ends of the attachment plate 105 in the sides of Y direction and the direction opposite to the Y direction, bolt insertion holes 106 are disposed as in the case of the bolt insertion holes 22 of the attachment plate 20 of the first embodiment. As in the first embodiment, bolts are inserted into the bolt insertion holes 106 to removably attach the cutting tool holder 100 to a support plate 38 of the final output shaft 35 of the robot 30. The attachment plate 105 corresponds to an attachment section of an external device.

On the lower outer peripheral surface of the lower elastic section 104, a scraper 107 is attached as a cutting member to a part Q1 in the vicinity of the center of the longitudinal direction. The attachment of the scraper 107 to the lower elastic section 104 is carried out by adhesive fixing, fastening by bolts or the like, or welding. The part Q1 is a part to be slightly moved in the opposite X direction as indicated by an arrow P in FIG. 7 when the ring 101 is compressed to be deformed in the vertical direction.

Figure 7:
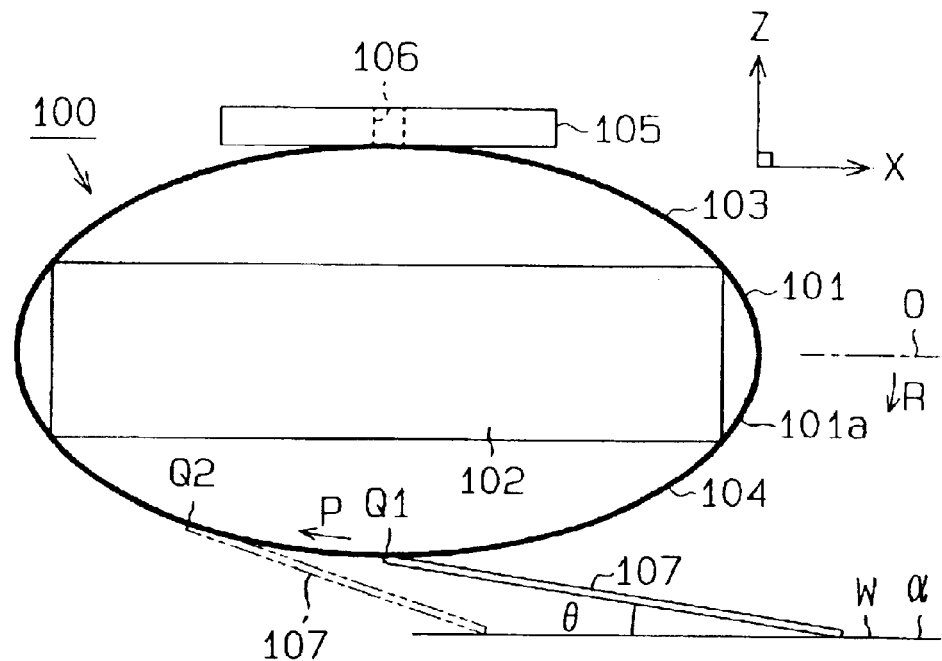
FIG. 7 is a side view of a cutting tool holder according to a second embodiment.
Figure 8:
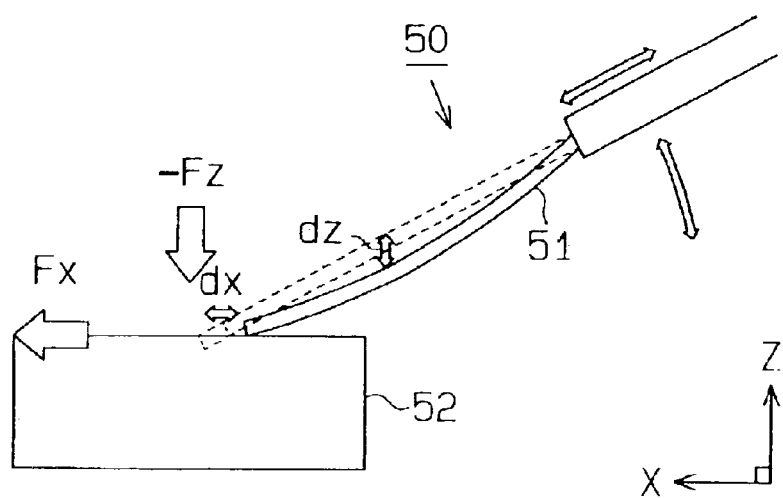
FIG. 8 is an explanatory view showing analysis of a cutting force applied to a tool during cutting in scraping work by a skilled hand, and displacement of the tool at the time.

A cutting edge of the distal end of the scraper 107 is extended in the X direction, and obliquely apart from the ring 101 as shown in FIG. 7.

The scraper 107 is arranged to have a predetermined angle θ with respect to a work material W, which has a horizontally arranged processed surface. In the second embodiment, when the horizontally arranged processed surface (surface) is set as an X-Y plane, and the ring 101 is arranged as shown in FIG. 7, an angle (predetermined angle θ) between the scraper 107 and the processed surface is set to 18°±10°.

The material of the work material W in the present embodiment is metal such as steel, cast iron and brass, or plaster.

Now, description will be given of an operation of the cutting tool holder 100 constituted in the foregoing manner.

In the second embodiment, as in the case of the first embodiment, the attachment plate 105 of the cutting tool holder 100 is fastened to the support plate 38 of the robot 30 by bolts (not shown) inserted into the bolt insertion holes 106.

Motion of the robot 30 (i.e., final output shaft 35) is similar to that described in the first embodiment. Thus, explanation thereof will be omitted, and the operation of the cutting tool holder 100 will be described.

According to the second embodiment, first, when a force of a vertical component is applied from the robot 30, the ring 101 is compressed in the vertical direction. Consequently, a phenomenon of pushing-back and biting in the work material W occurs in the cutting edge of the scraper 107 (see "A" of moving locus).

Then, when the scraper 107 is moved in the horizontal direction (opposite X direction) (see "B"→"C"→"D" of the moving locus of FIG. 4), the attachment plate 105 attached to the robot 30 becomes a node to deform the ring 101 in the inclining direction R (see FIG. 7). In FIG. 7, a reference code O denotes a line to pass through a long axis of the ring 101 when no inclination occurs. It is known that such deformation occurs in the elliptical ring.

By such deformation, the scraper 107 bites in the work material W further.

At this time, in the part Q1, to which the scraper 107 is attached, a phenomenon of pulling back the ring 101 in the opposite X direction occurs. Accordingly, a part of a returning amount indicated between "A", "B" of the moving locus of FIG. 4 (horizontal direction "d" between the pull-back point "B" and the lowest point "C") is compensated for. Only a small returning amount (several μm or more) is enough.

Subsequently, the scraper 107 is moved in the horizontal direction (X direction), the opposite Z direction (see "B"→"C" of the moving locus of FIG. 4), and the horizontal direction (X direction) and the Z direction (see "C"→"D" of the moving locus of FIG. 4) for the cutting.

At this time, the scraper 107 advances in the X direction. In the initial stage of the movement in the X direction, however, the ring 101 is deformed against its own elasticity, i.e., while storing elastic energies. In a part related to the ring 101, because of a small spring constant, initial starting torque of the robot 30 is raised by a weak elastic force. Accordingly, torque necessary for a sufficient cutting force is obtained thereafter.

Also in the second embodiment, in order to enable the final output shaft 35 of the robot 30 to make linear motion in the initial stage of the movement in the X direction, motive powers of all the units of the robot must be started all at once. However, in the second embodiment, for the elastic deformation of the ring 101, storing of elastic energies, and gaining of time until the starting torque of the motor rises are also carried out.

As the result, driving torque becomes large during the gained time, and the cutting can be carried out even by small starting torque of the robot 30.

Subsequently, when movement is made in the horizontal direction (X direction), the cutting stabilization tool 102 functions to obtain the sufficient rigidity (high rigidity), and accordingly the work material W is cut.

If the cutting stabilization tool 102 is not disposed, when chatter vibration is generated because of a shortage of the rigidity of the ring 101 while the scraper 107 carries out the cutting along the moving locus of "B"→"C"→"D", the chatter vibration is also propagated to the processed surface of the work material W. When the chatter is propagated, a commercial value of the cut work material W is reduced.

However, according to the second embodiment, setting of a nonlinear spring constant is decided depending on the thickness, width and material of the ring 101, and the material and cutting amount of the work material W so that the cutting stabilization tool 102 can be operated from a position a little after the point "B". That is, the nonlinear spring constant is set in such a way as to function the cutting stabilization tool 102 when a position a little before the point "C" is reached.

Consequently, the cutting tool holder 100 exhibits a nonlinear effect to suppress chatter vibration.

In addition, an intrinsic frequency of the cutting stabilization tool 102 is set so as not to resonate with a vibration frequency of ring 101.

Therefore, the processed surface of the work material W is not adversely affected by chatter vibration, whereby a good processed surface can be obtained.

Thus, the scraper 107 is moved from a point "D" to the outside of the work material W to finish a series of processing operations.

Then, in order to move the scraper 107 to another position (processing position) for executing another scraping, a control unit moves the final output shaft 35 to continuously carry out similar processing work in accordance with a control program.

In this manner, in the cutting tool holder 100, stable scraping can be carried out.

The second embodiment provides the following operation effects in addition to effects similar to those (8) to (11) of the first embodiment.

(1) The cutting tool holder 100 of the second embodiment is provided with the attachment plate 105 (attachment section of an external device) attached to the final output shaft 35 (external device). The cutting tool holder 100 is also provided with the ring 101 fixed to the attachment plate 105, and having the ring main body 101a, which is formed to have elastic forces at least in the Z direction and the direction opposite to the Z direction (first direction and direction opposite to the first direction), and the X direction orthogonal to the Z direction and the direction opposite to the X direction (second direction and direction opposite to the second direction).

In the ring 101, on a side opposite to the side of the attachment plate 105, the scraper 107 (cutting member) is disposed to be extended in the X direction (second direction), and obliquely to set the cutting edge apart from the ring 101.

The ring main body 101a of the ring 101 is provided with the cutting stabilization tool 102 (highly rigid member) higher in the rigidity than the ring main body 101a.

In an initial stage where a force of the X direction (second direction) is applied to the ring 101, the ring 101 has elasticity in the X direction and the opposite X direction to exhibit the low rigidity, and the high rigidity by the cutting stabilization tool 102 (highly rigid member) after the passage of the initial stage.

Thus, the cutting edge of the scraper 107 bites in the work material W, and initial driving torque of each motor is small. Therefore, in a case where each motor cannot be started in this state, for deformation of the ring 101 in the X direction, elastic energies can be stored, and time can be gained until motor starting torque rises.

Therefore, the cutting can be carried out even by small starting torque of the robot 30.

Thus, in the cutting tool holder 100, chatter vibration can be suppressed.

(2) According to the second embodiment, the ring 101 is formed to be elliptical in shape.

Therefore, the cutting tool holder 100 can be constituted, which is provided with the ring 101 capable of realizing the foregoing operation effect (1) by a simple shape.

(3) In the cutting tool holder 100 of the second embodiment, the cutting stabilization tool 102 (highly rigid member) has an intrinsic frequency which does not resonate with a vibration frequency of the ring 101.

Therefore, the processed surface of the work material W is not adversely affected by chatter vibration, whereby a good processed surface can be obtained.

Next, description will be given of a third embodiment by referring to FIG. 9.

According to the third embodiment, a cutting stabilization tool 70 is added to the constitution of the first embodiment.

That is, the upper end of the cutting stabilization tool 70 is fixed to the bottom of an attachment plate 20. The fixing of the cutting stabilization tool 70 to the attachment plate 20 is carried out by an adhesive, welding, bolts or the like. A lower end of the cutting stabilization tool 70 is arranged apart from, and facing a first attachment plate 14 of connection fitting 13.

The cutting stabilization tool 70 is arranged to be positioned between the attachment plate 20 and the first attachment plate 14, and in parallel with a first ring 11.

Figure 9:
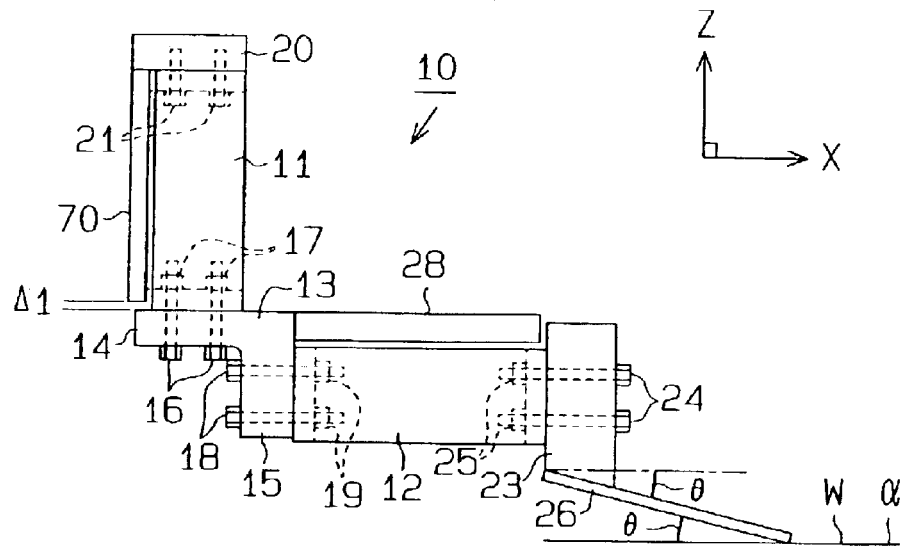
FIG. 9 is a side view of a cutting tool holder according to a third embodiment.

A distance Δ1 between the cutting stabilization tool 70 and the first attachment plate 14 is set to a size that enables abutment when the first ring 11 is deformed in the direction of approaching both ends thereof to each other against its own elasticity in the Z direction shown in FIG. 9. The distance Δ1 is set in such a way as to obtain time for generating sufficient starting torque when a large reactive force is applied on a final output shaft 35 of a robot arm 32 of a robot 30, to which a cutting tool holder 10 is attached.

That is, the distance Δ1 is set such that, when a scraper 26 advances to a position approximately identical to a point "B" in a moving locus "A"→"B"→"C"→"D" of the scraper 26 (see FIG. 4), or slightly from the point "A" in the direction opposite to Z, the first ring 11 is deformed to abut the cutting stabilization tool 70 on the first attachment plate 14.

When a deformation degree of the first ring 11 becomes large, the cutting stabilization tool 70 is abutted on the first attachment plate 14.

The lower end of the cutting stabilization tool 70 may be fixed to the first attachment plate 14 to be supported, while the upper end thereof may be arranged apart from, and facing the bottom of the attachment plate 20. In this case, a distance between the cutting stabilization tool and the attachment plate is set in such a way as to abut the cutting stabilization tool 70 on the attachment plate 20 during deformation of the first ring 11.

In this case, as a deformation degree of the first ring 11 in the Z direction and the direction opposite to the Z direction becomes larger, the cutting stabilization tool 70 operatively interconnects the attachment plate 20 and the connection fitting 13 through the cutting stabilization tool 70.

The cutting stabilization tool 70 corresponds to a second highly rigid member, and set to be higher in the rigidity than the first ring 11 and the second ring 12.

In addition, the cutting stabilization tool 70 has an intrinsic frequency that does not resonate with a vibration frequency of each of the first ring 11 and the second ring 12.

Other components and members are similar to those of the first embodiment, and thus denoted by similar reference numerals.

According to the constitution of the first embodiment, under a proper combination of various conditions, a clean cut surface is obtained on the processed surface of the work material W. Those conditions include the thicknesses, widths, and materials of the first ring 11 and the second ring 12; the material and a cutting amount (depth, length, width or the like) of the work material, and the cutting speed. This has been confirmed by experiments.

Figure 10A:
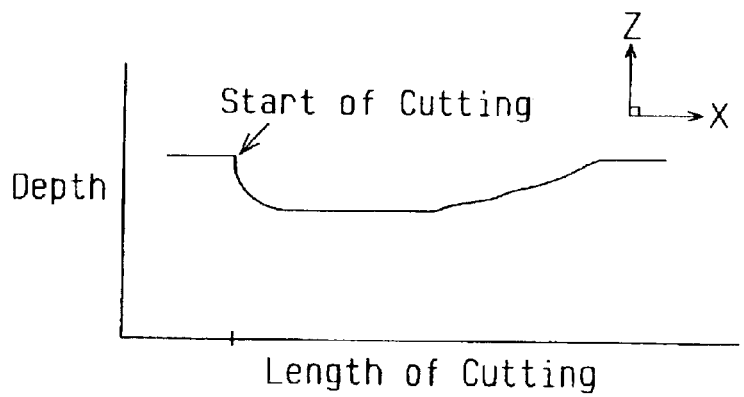
FIGS. 10(a) and 10(b) are schematic views of cutting traces.
Figure 10B:
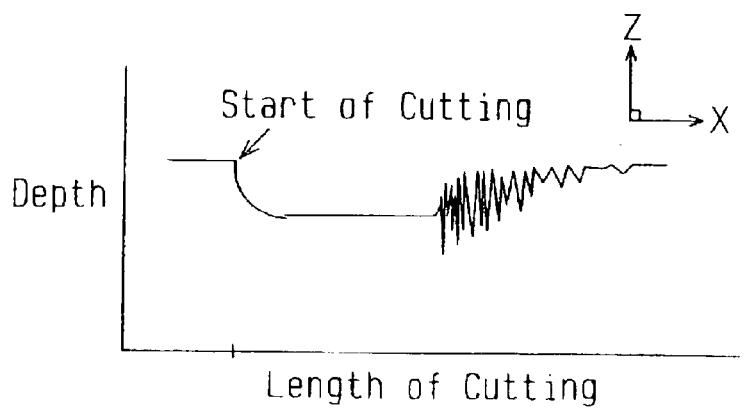

FIGS. 10(a) and 10(b) are schematic views of cutting traces. An ordinate shows a depth of a cutting trace (unit: μm) on the processed surface, and an abscissa shows a length of a cutting trace (length when the cutting is executed in the X direction, unit: mm). The ordinate shows an enlargement of the actual depth.

In the case where the combination of the cutting conditions was not proper, setting of a state similar to that shown in FIG. 10(b) was confirmed. In FIG. 10(b), a cutting trace is shown, where a continuous irregular part is formed.

If the cutting conditions are not proper, the following can be presumed to be occurring.

In the cutting trace, it was confirmed that the state of the continuous irregular trace appeared after the passage through the point "C" or at the point "C" shown in FIG. 4. Occurrence of such a trace reduces a commercial value. After the passage of the point "C", work is to raise the final output shaft 35 of the robot 30 in a vertical direction (Z direction) and, simultaneously, the first ring 11 is released from the compressed state to be fully extended. Thus, following the releasing from the bound state, vibration is presumed to occur in the first ring 11 depending on its spring constant.

The constitution of the present embodiment can deal with a wider range of cutting conditions than the first embodiment.

According to the present embodiment, after the passage through the point "C", the final output shaft 35 of the robot 30 is raised in the vertical direction (Z direction) and, simultaneously, the first ring 11 is released from its compressed state to reduce an external force applied thereto. At this time, in the first embodiment, vibration occurs depending on a spring constant. However, in the present embodiment, the external force to the first ring 11 is transferred from the final output shaft 35 to the cutting stabilization tool 70 to suppress amplitude of vibration. Accordingly, by the suppression of vibration, as shown in FIG. 10(a), a good processed surface of the work material W is obtained, where no continuous irregular traces are present, different from the cutting trace of FIG. 10(b).

Thus, the third embodiment provides the following effect.

(1) According to the third embodiment, the cutting stabilization tool 70 (second highly rigid member) having rigidity higher than that of the first ring 11 (first elastic member) and the second ring 12 (second elastic member) is disposed in parallel with the first ring 11. As a deformation degree of the first ring 11 in the Z direction (first direction) and in the direction opposite to the Z direction (opposite first direction) increases, the cutting stabilization tool 70 operably connects the attachment plate 20 (attachment section of the external device), the connection fitting 13 (member) connected to the second ring 12, and the first ring 11 with one another.

If the degree of deformation of the first ring 11 in the Z direction and the opposite Z direction is small, the low rigidity is exhibited by the first ring 11. If the degree of deformation of the first ring 11 in the Z direction and the opposite Z direction is large, the high rigidity is exhibited by the cutting stabilization tool 70.

Therefore, by complying with the wider range of cutting conditions than the first embodiment, a good cutting trace of the work material W can be obtained.

The constitution of each of the embodiments may be changed in the following ways.

(1) In the cutting tool holder 10 of the first embodiment, the first ring 11 (first elastic member) and the second ring 12 (second elastic member) are indirectly connected through the connection fitting 13 (elastic connection member). Instead, a constitution may be adopted, where a thickness of the bottom of the first ring 11 is increased more than that of the first embodiment, and the second ring 12 is directly connected to the thick bottom.

(2) In the cutting tool holder 10 of the first embodiment, between the connection fitting 13 (elastic connection member) and the scraper attaching plate 23 (attachment section of the cutting portion) is disposed the cutting stabilization tool 28 (first highly rigid member) having higher rigidity than the first ring 11 and the second ring 12. In place of this constitution, the cutting stabilization tool 28 may be arranged to be positioned between the first ring 11 (first elastic member) and the scraper attaching plate 23 (attachment section of the cutting portion).

(3) In the first embodiment, the first ring 11 and the second ring 12 are used respectively as the first elastic member and the second elastic member. In place of these rings, other springs such as coil springs may be used.

Figure 6:
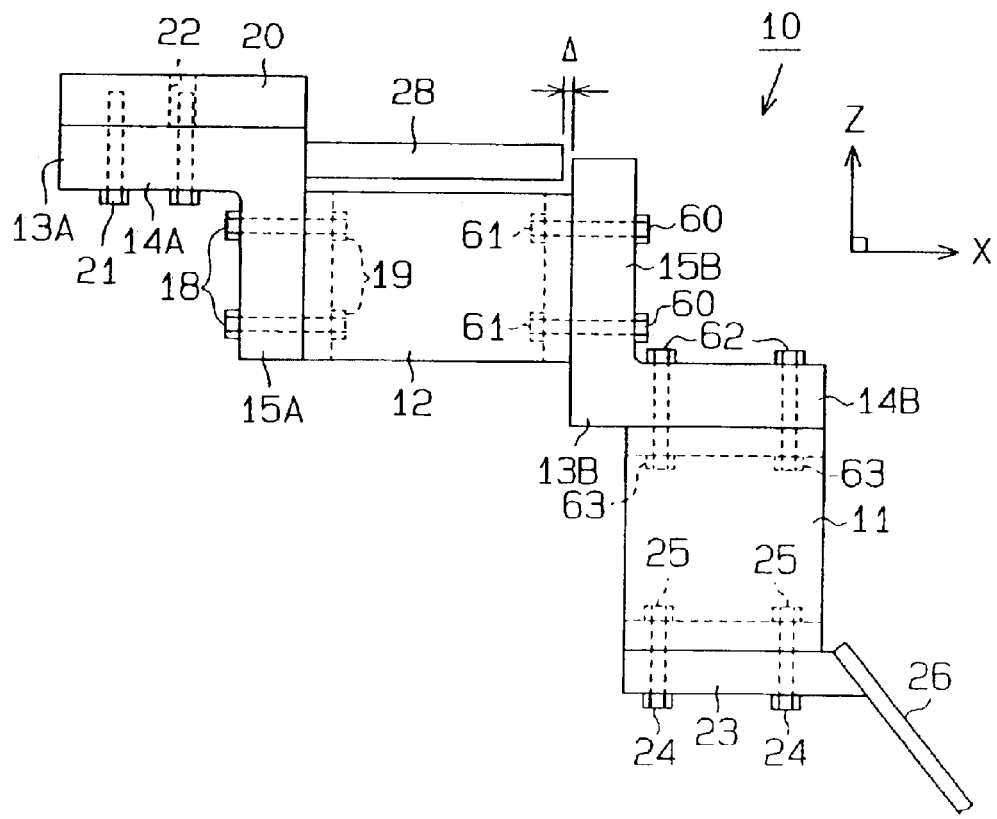
FIG. 6 is a side view showing another example of a cutting tool holder.

Next, description will be a cutting tool holder 10 shown in FIG. 6 as a modified example of the first embodiment.

Components similar to, or equivalent to, those of the first embodiment are denoted by similar reference numerals, and description thereof will be omitted. Different portions will be mainly described.

The cutting tool holder 10 is provided with a first ring 11 and a second ring 12, and a pair of connection fittings. The pair of connection fittings is respectively referred to as a first connection fitting 13A and a second connection fitting 13B. The first connection fitting 13A and the second connection fitting 13B are respectively constituted of first attachment plates 14A and 14B, and second attachment plates 15A and 15B. Both attachment plates are L-shaped in section, and connected so as to have elasticity. The thickness of the inner side of a connection portion between the first attachment plate 14A and the second attachment plate 15A is increased along a circular arc to be reinforced.

The first ring 11 and the second ring 12 are connected through the connection fitting 13. That is, the second ring 12 is fastened by bolts 60 and nuts 61 to the second attachment plate 15B of the second connection fitting 13B. The first ring 11 is fastened by bolts 62 and nuts 63 to the first attachment plate 14B of the second connection fitting 13B.

In addition, an attachment plate 20 is fastened to the first attachment plate 14A of the first connection fitting 13A by bolts 21. The second ring 12 is fastened to the second attachment plate 15A of the first connection fitting 13A by bolts 18 and nuts 19.

Then, a proximal end of the cutting stabilization tool 28 is fixed to the second attachment plate 15A, and a distal end thereof is arranged facing the second attachment plate 15B of the second connection fitting 13B so as to have a distance Δ.

A scraper attaching plate 23 is fastened and fixed by bolts 24 and nuts 25 to a bottom of the first ring 11. A scraper 26 is attached and fixed to the scraper attaching plate 23.

The first ring 11 corresponds to a first elastic member, and the second ring 12 corresponds to a second elastic member.

The second connection fitting 13B corresponds to an elastic connection tool of the present invention. The first attachment plate 14B corresponds to a first attachment section, and the second attachment plate 15B corresponds to a second attachment plate.

With the above-described constitution, effects similar to those of the cutting tool holder 10 of the first embodiment are provided.

In the second embodiment, while the ring 101 is formed to be elliptical in shape, it may be formed to be circular in shape.

According to the second embodiment, the scraper 107 is attached and fixed to the part Q1 in the vicinity of the center of the longitudinal direction on the outer peripheral surface of the bottom of the lower elastic section 104. The scraper 107 may be attached and fixed to a part Q2 positioned in the opposite x direction side in place of the part Q1.

The part Q2 is a part to be slightly moved in the opposite X direction as indicated by an arrow P in FIG. 7 when the ring 101 is compressed to be deformed in the vertical direction.

Accordingly, when the ring 101 is compressed to be deformed in the vertical direction, slight movement is made in the opposite X direction, as indicated by the arrow P of FIG. 7. Furthermore, by a pull-back phenomenon, a part of a returning amount between the points "A" and "B" of the moving locus of FIG. 4 (horizontal distance "d" between the pull-back point "B" and the lowest point "C") can be compensated for.

In the part Q1 of the second embodiment, a distance from the proximal end of the scraper 107 to a part of abutment of the cutting edge of the scraper 107 on the work material W is long to increase a moment arm, consequently enlarging a load on the robot 30. On the other hand, when the scraper 107 is attached to the part Q2, a moment arm is reduced to lower a load on the robot 30, thereby improving workability. Therefore, an advantage is provided to enable an attachment position of the scraper 107 to be selected in accordance with the size of torque of the robot 30.

Thus, the attachment position of the scraper 107 may be changed in accordance with a motion direction, and a direction of the scraper 107, and performance of the robot 30.

Figure 11:
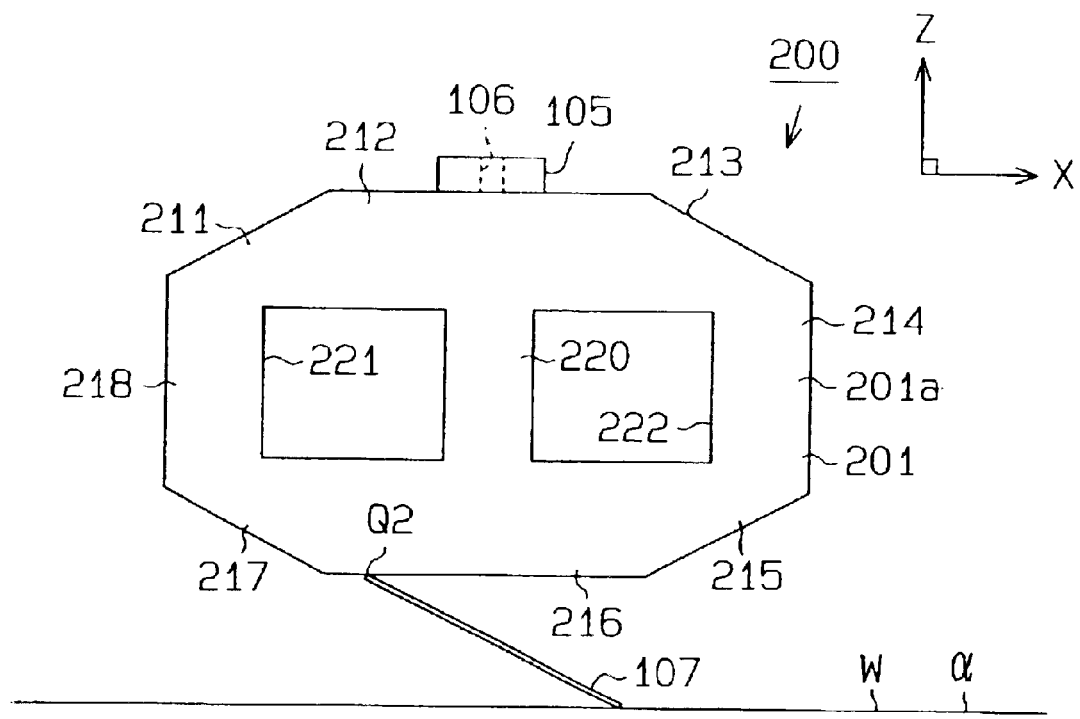
FIG. 11 is a side view showing another example of a cutting tool holder.

In place of the elliptical ring 101 of the second embodiment, as shown in FIG. 11, a ring 201 provided with an octagon-shaped ring main body 201a may be used. Components similar to, or equivalent to those of the second embodiment or the modified example are denoted by similar reference numerals.

As shown in FIG. 11, the ring main body 201a of a cutting tool holder 200 is provided with sides 211 to 218, each of which makes a predetermined angle with the other adjacent side. In the ring main body 201a, a cutting stabilization section 220 provided with a predetermined width to build a bridge between the sides 212 and 216 is integrally disposed. By the cutting stabilization section 220, a pair of holes 221, 222 is formed to align in the X direction.

According to this modified example, elastic deformation when a force of an opposite Z direction is applied to the cutting tool holder 200 is mainly received by the sides 211, 213, 215, 217. Accordingly, in manufacturing this cutting tool holder 200, the magnitude of the force of the opposite Z direction is set beforehand, and the thickness, length, material and the like are set in accordance with the magnitude.

When the cutting tool holder 200 is moved in the X direction to obtain a cutting force necessary for the work material W, the cutting force changes, depending on the rigidity of each of the sides 212, 214, 216 and 218. Thus, to obtain necessary cutting force, thickness, length, material and the like of each of the sides 212, 214, 216 and 218 are set beforehand.

As strength of the cutting tool holder 200 can also be changed depending on sizes of the holes 221, 222, by a size (width and thickness) of the cutting stabilization section 220, effects similar to those of the cutting stabilization tool 102 of the second embodiment can be provided. In other words, the cutting stabilization section 220 corresponds to a third highly rigid member.

A part, to which the scraper 107 is attached, is Q2 of the side 216 in FIG. 11. However, any one of the sides 215, 216 and 217 may be selected. By selection of this attachment position, a moment arm of the scraper 107 can be designated to various sizes.

In the constitution of the first embodiment, the cutting stabilization tool 28 may be omitted, or replaced by a tool having the low rigidity. In this case, by the cutting stabilization tool 28, the constitution is sufficiently applicable to the case of cutting conditions, where no chatter vibration occurs, for example, a case where a material of the work material W is a non-metal plastic material, such as wood or plastic.

In the cutting tool holder 10 of the third embodiment, the first ring 11 (first elastic member) and the second ring 12 (second elastic member) are indirectly connected through the connection fitting 13 (other member). In place of this indirect connection, one end of the second ring 12 may be increased in thickness more than that of the third embodiment, and the first ring 11 may be directly connected to this part. Then, the cutting stabilization tool 70, one end of which is fixed to the attachment plate 20, may be operatively connected to the portion of which thickness is increased in the second ring 12 by setting a distance Δ1.

In each of the embodiments, the inner side of the connection portion between the first attachment plate 14 and the second attachment plate 15 (the first attachment plate 14A and the second attachment plate 15A, the first attachment plate 14B and the second attachment plate 15B) is thickened along the circular arc. However, this portion may be omitted.

In the respective embodiments, the cutting tool holders 10, 100, 200 were used for scraping. However, the invention is not limited to these cutting tool holders.

The cutting tool holder of the present invention can be used as a cutting tool holder characterized by a flexible structure in cutting other than scraping.

According to each of the embodiments, the cutting tool holder is attached to the industrial robot. However, the cutting tool holder may be attached to other machines, such as an N/C device or an M/C device. In such a device, chiseling that has been considered to be difficult by a machine can now be carried out by a machine. In other words, in all the processing fields that have needed artisan skills, automation by machines will become possible.

In the embodiments, the cutting members are the scrapers 26, 51 and 107. However, a cutting tool such as a chisel or a hatchet may be used as a cutting member. Moreover, if a cutting tool is a kitchen knife or the like, it can be widely applied to general processing including foodstuff processing.

That is, in all the fields accompanied by the cutting, processing work carried out by emphasizing human "flexibility" can be reproduced by machine automation.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered as illustrative and not restrictive and the invention is not to be limited to the details given herein, but may be modified within the scope and equivalence of the appended claims.

What is claimed is:

1. A cutting tool holder, for holding a cutting member, which is attached to a drive unit for driving the cutting member, the cutting tool holder comprising:
    a first elastic member elastically deformable in a first direction;
    a second elastic member elastically deformable in a second direction different from the first direction;
    an elastic connection member for elastically connecting the first and second elastic members;
    a first attachment member disposed in the first elastic member and connected to the drive unit; and
    a second attachment member, disposed in the second elastic member, for attaching the cutting member,
    wherein a first highly rigid member, having higher rigidity than that of the first elastic member and the second elastic member, is disposed in parallel with the second elastic member,
    wherein, when a deformation degree of the second elastic member in the second direction is at least a predetermined amount, the first elastic member is connected to the second attachment member through the first highly rigid member, and
    wherein, when the deformation degree of the second elastic member in the second direction is less than the predetermined amount, the first elastic member is not connected to the second attachment member through the first highly rigid member,
    wherein the first highly rigid member is fixed at a proximal end thereof to the elastic connection member, and a predetermined space is set between a distal end of the first highly rigid member and the second attachment member.

2. The cutting tool holder according to claim 1, wherein the second direction is orthogonal to the first direction.

3. The cutting tool holder according to claim 1, wherein a second highly rigid member, having higher rigidity than that of the first elastic member and the second elastic member, is disposed in parallel with the first elastic member, wherein, when a deformation degree of the first elastic member in the first direction is at least a predetermined amount, the first attachment member is operatively connected to the second elastic member through the second highly rigid member, and
    wherein, when the deformation degree of the first elastic member in the first direction is less than the predetermined amount, the first attachment member is not connected to the second elastic member through the second highly rigid member.

4. The cutting tool holder according to claim 1, wherein the first elastic member is formed in a ring shape.

5. The cutting tool holder according to claim 1, wherein the second elastic member is formed in a ring shape.

6. The cutting tool holder according to claim 1, wherein the first elastic member and the second elastic member are connected through the elastic connection member,
    the elastic connection member is L-shaped in section by a first attachment section and a second attachment section, and
    the first elastic member and the second elastic member are fixed to the first attachment section and the second attachment section, respectively.

7. The cutting tool holder according to claim 1, wherein the first highly rigid member has an intrinsic frequency that does not resonate with a frequency of the first elastic member and does not resonate with a frequency of the second elastic member.

8. The cutting tool holder according to claim 1, wherein the drive unit is a robot.

* * * * *